United States Patent
Lee et al.

(10) Patent No.: US 9,881,604 B2
(45) Date of Patent: Jan. 30, 2018

(54) SYSTEM AND METHOD FOR IDENTIFYING SPECIAL INFORMATION

(71) Applicant: Intellisist, Inc., Seattle, WA (US)

(72) Inventors: Howard M. Lee, Seattle, WA (US); Steven Lutz, Seattle, WA (US); Gilad Odinak, Bellevue, WA (US)

(73) Assignee: Intellisist, Inc., Seattle, WA (US)

( * ) Notice: Subject to any disclaimer, the term of this patent is extended or adjusted under 35 U.S.C. 154(b) by 15 days.

(21) Appl. No.: 14/617,823

(22) Filed: Feb. 9, 2015

(65) Prior Publication Data

US 2015/0302849 A1    Oct. 22, 2015

Related U.S. Application Data

(63) Continuation of application No. 14/071,639, filed on Nov. 4, 2013, now Pat. No. 8,954,332, which is a continuation of application No. 11/181,572, filed on Jul. 13, 2005, now Pat. No. 8,577,684.

(51) Int. Cl.

| | |
|---|---|
| *G10L 21/00* | (2013.01) |
| *G10L 15/00* | (2013.01) |
| *G10L 15/04* | (2013.01) |
| *G10L 15/26* | (2006.01) |
| *H04L 9/32* | (2006.01) |
| *G10L 17/00* | (2013.01) |
| *G10L 21/02* | (2013.01) |

(52) U.S. Cl.
CPC .............. *G10L 15/04* (2013.01); *G10L 15/26* (2013.01); *G10L 17/00* (2013.01); *G10L 17/005* (2013.01); *G10L 21/00* (2013.01); *G10L 21/02* (2013.01); *H04L 9/3231* (2013.01); *H04L 2209/04* (2013.01); *H04L 2209/56* (2013.01)

(58) Field of Classification Search
CPC ....... G10L 15/265; G10L 15/22; G10L 15/32; G06F 21/00; G06F 21/60
See application file for complete search history.

(56) References Cited

U.S. PATENT DOCUMENTS

| | | |
|---|---|---|
| 5,621,454 A | 4/1997 | Ellis et al. |
| 5,732,394 A | 3/1998 | Nakadai et al. |
| 5,884,262 A | 3/1999 | Wise et al. |
| 5,974,385 A | 10/1999 | Ponting et al. |
| 6,029,124 A | 2/2000 | Gillick et al. |
| 6,269,332 B1 | 7/2001 | Choo et al. |
| 6,477,492 B1 | 11/2002 | Conner |
| 6,519,699 B2 | 2/2003 | Lu et al. |

(Continued)

*Primary Examiner* — Abdelali Serrou
(74) *Attorney, Agent, or Firm* — Patrick J. S. Inouye; Krista A. Wittman

(57) ABSTRACT

A system and method for identifying special information is provided. Endpoints are defined within a voice recording. One or more of the endpoints are identified within the voice recording and the voice recording is partitioned into segments based on the identified endpoints. Elements of text are identified by applying speech recognition to each of the segments and a list of prompt list candidates are applied to the text elements. The segments with text elements that match one or more prompt list candidates are identified. Portions of the voice recording following the prompt list candidates that include special information are identified and the special information is rendered unintelligible within the voice recording.

18 Claims, 7 Drawing Sheets

(56) References Cited

U.S. PATENT DOCUMENTS

| | | | |
|---|---|---|---|
| 6,594,630 B1 * | 7/2003 | Zlokarnik | G10L 15/26 704/241 |
| 6,754,155 B1 | 6/2004 | Hayashi et al. | |
| 6,785,810 B1 * | 8/2004 | Lirov | G06F 21/606 707/999.009 |
| 6,865,162 B1 | 3/2005 | Clemm | |
| 6,934,684 B2 | 8/2005 | Alpdemir et al. | |
| 6,938,163 B1 * | 8/2005 | Birkler | G06F 21/6209 713/193 |
| 7,016,844 B2 | 3/2006 | Othmer et al. | |
| 7,024,364 B2 | 4/2006 | Guerra et al. | |
| 7,174,297 B2 | 2/2007 | Guerra et al. | |
| 7,188,086 B2 * | 3/2007 | Shinzaki | H04L 63/04 705/51 |
| 7,328,276 B2 | 2/2008 | Alisuag | |
| 7,343,173 B2 | 3/2008 | Leedom, Jr. | |
| 7,418,600 B2 | 8/2008 | Dettinger et al. | |
| 7,502,741 B2 | 3/2009 | Finke et al. | |
| 7,599,847 B2 | 10/2009 | Block et al. | |
| 7,698,441 B2 | 4/2010 | Dettinger et al. | |
| 8,266,451 B2 | 9/2012 | Leydier et al. | |
| 2002/0055909 A1 * | 5/2002 | Fung | G06Q 20/10 705/42 |
| 2002/0150245 A1 * | 10/2002 | Sugimoto | G11B 19/122 380/201 |
| 2002/0152262 A1 * | 10/2002 | Arkin | G06F 21/10 709/202 |
| 2002/0193997 A1 | 12/2002 | Fitzpatrick | |
| 2003/0125958 A1 | 7/2003 | Alpdemir et al. | |
| 2004/0049687 A1 * | 3/2004 | Orsini | G06F 21/31 713/189 |
| 2004/0199596 A1 * | 10/2004 | Nutkis | G06F 21/6245 709/207 |
| 2004/0210637 A1 | 10/2004 | Loveland | |
| 2005/0074113 A1 | 4/2005 | Mathew et al. | |
| 2005/0138110 A1 * | 6/2005 | Redlich | C07K 14/70575 709/201 |
| 2005/0138390 A1 * | 6/2005 | Adams | G06F 1/1626 713/185 |
| 2005/0238174 A1 | 10/2005 | Kreitzer | |
| 2006/0095262 A1 * | 5/2006 | Danieli | G10L 15/08 704/251 |
| 2006/0118617 A1 | 6/2006 | Rose | |
| 2006/0210071 A1 | 9/2006 | Chandran et al. | |

* cited by examiner

100

150

200

300

400

425

500

600

SYSTEM AND METHOD FOR IDENTIFYING SPECIAL INFORMATION

CROSS-REFERENCE TO RELATED APPLICATION

This application is a continuation of U.S. Pat. No. 8,954,332 issued May 7, 2014, which is a continuation of U.S. Pat. No. 8,577,684 issued Nov. 5, 2013, the disclosures of which are incorporated by reference.

FIELD

Embodiments of the invention relate generally to limiting access to information and, more specifically, to a system and method for identifying special information.

BACKGROUND

Personal information is routinely collected during transactions in modern society. Recordings of conversations are continuously made in a variety of situations such as customer-agent interactions during contacts within the context of call centers, emergency service interactions (911 calls, etc.), and a myriad of other transactions that require personal information to flow from one individual to another.

During these transactions, personal information such as social security numbers, credit card numbers, bank account numbers, personal identification numbers (PIN), names, addresses, club numbers, frequent flier numbers, etc. is sensitive and can harm the person to whom the information pertains if the information is misused. This can present a problem.

Such sensitive information can be stored in a variety of locations or transferred to other parties for various reasons, all of which can place the information at risk of compromise by others. Hackers have become proficient at compromising data bases which house such sensitive information. Accounts can be pilfered, the identity of an individual can be stolen, and the individual can be placed in physical harm by unscrupulous actors. This can present a problem.

Information collected during the business transactions mentioned above can be transferred to entities for analysis. It has become a widespread business practice to record calls between customers and agents of a business during business transactions. Such recorded information is often times transferred to a party for analysis. An example is the quality review of a recording that contains personal information. While it is the intent of the data owner to transfer the data to a party for analysis, it is often the case that the party should not have access to the personal information contained within a transaction. This can present a problem.

Current attempts at securing sensitive information within recorded conversations or recorded speech have been directed to manually monitoring the speech and then subsequently deleting the sensitive information. Such a practice can be expensive in light of the volume of such data that is currently being created. Such manual censoring of recorded conversations and speech is not economically practical to meet all of the current need in the marketplace. This can present a problem.

Data which is considered sensitive, personal, confidential, or that should otherwise be secured from recognition can vary from one business to another. For example, in a medical context where a disease should be kept separate from a patient's name and address, the patient's name and address are considered to be the sensitive information that should not be readily available to others apart from the data owner. In some settings, such as in financial service settings, the customer's name and address are not necessarily the sensitive information, rather it is typically the customer's account number, personal identification number (PIN), etc. that is considered sensitive and should be secured. Variability of what is sensitive information, from one setting to another, complicates handling sensitive information since a uniform definition of sensitive information does not exist. This can present a problem.

SUMMARY

An embodiment provides a system and method for identifying special information. Endpoints are defined within a voice recording. One or more of the endpoints are identified within the voice recording and the voice recording is partitioned into segments based on the identified endpoints. Elements of text are identified by applying speech recognition to each of the segments and a list of prompt list candidates are applied to the text elements. The segments with text elements that match one or more prompt list candidates are identified. Portions of the voice recording following the prompt list candidates that include special information are identified and the special information is rendered unintelligible within the voice recording.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

In the following detailed description of embodiments of the invention, reference is made to the accompanying drawings in which like references indicate similar elements and in which are shown by way of illustrations, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense and the scope of the invention is defined only by the appended claims.

Apparatuses and methods are described to secure information contained within voice recordings.

Figure 1A:
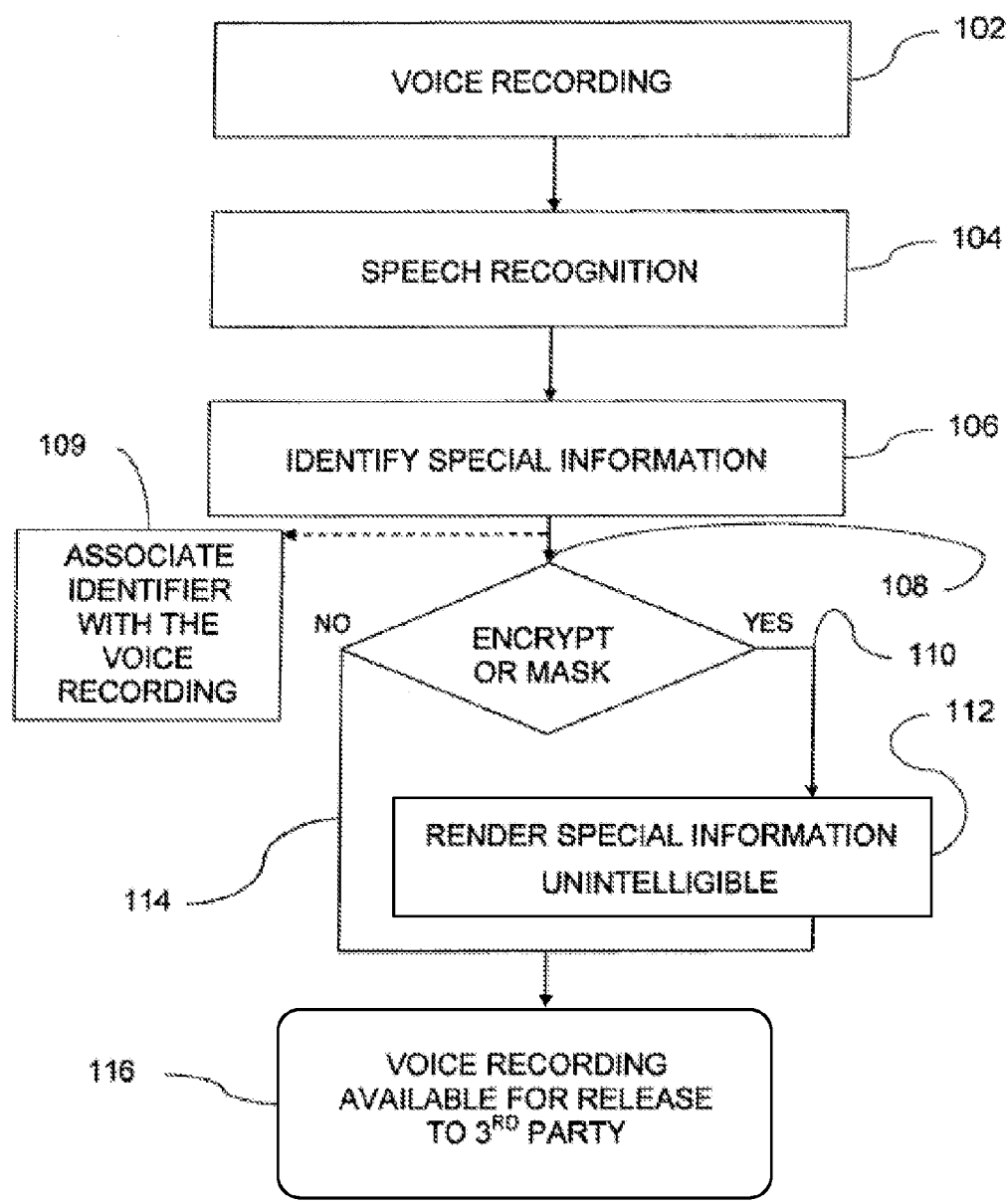
FIG. 1A illustrates using speech recognition to process a voice recording according to embodiments of the invention.

FIG. 1A illustrates, generally at 100, using speech recognition to process a voice recording according to embodiments of the invention. With reference to FIG. 1A, a person capable of making an utterance interacts with a business entity. Such an interaction results in one or more utterances being made during a conversation between the person and the business entity. Recording equipment is employed to make a voice recording 102 of the utterances made during the interaction between the person and business entity. An example of some equipment that can be used to make a voice recording is described more fully below in conjunction with FIG. 1B. As used herein, the term "business entity" is afforded broad meaning and can take on a variety of forms, wherein a variety of goods and/or services can be provided to the person by a business entity. The term "business entity" is described more fully below.

In general, a person is considered to be a repository of special information; some of this special information comes into the possession of the business entity during an interaction between the person and the business entity. This special information can be referred to as personal, private, confidential, sensitive, secret, etc. The exact term used to label the special information does not limit embodiments of the invention described herein.

Labels such as "personal," "private," "confidential," "sensitive," etc. are used within different settings to describe special information to which access should be limited. It will be explained further below that special information in one case may not be identical with special information in another case. Hence, exactly what information is to be considered "special" is defined by the context of use (use case) by a user(s) and is covered within embodiments of the invention.

As mentioned above, the interaction between a person and the business entity can occur in a variety of ways, within which information flows. Many contacts between a person and a business entity occur in the context of communications utilizing electronic means, such as a telephone, a cellular telephone, a microphone, a computer, and voice over IP (Internet Protocol) technology, etc. Assisted by such communication systems, two people or one person and an automated system can carry on a conversation, where one person or automated system propounds questions and the other responds to the questions. During the conversation, special information is uttered by the person, generally in reply to questions or prompts from another person or automated system representing the business entity. A live person representing the business entity can be considered an interface of the business entity. In another example, an interaction occurs in a setting where a business entity provides an automated interface to interact with human customers. In such a setting, a human contacts a business entity and encounters an automated interface or system interface that propounds a series of questions which elicit answers from the human. The answers can contain special information pertaining to the human.

Following an interaction, as described above, the voice recording 102, obtained thereby, is input to a speech recognition process 104. The speech recognition process 104 processes the voice recording and performs speech recognition on the voice recording 102, which creates a representation of the voice recording as text in a particular language. The language used to render the text can be: English, Spanish, French, Dutch, German, etc. Commercially available speech recognition algorithms marketed as software applications and/or marketed as software/hardware solutions can be used to perform the speech recognition process. Examples of such commercially available applications and solutions are Dragon NaturallySpeaking™8, as well as products from SpeechWorks, Locus, Nuance, etc.

The recognized speech (textual representation) is input to an identification process at 106 to identify instances of special information uttered and captured in the voice recording 102. A list of words that are considered to signify requests for special information can be set by a user(s) for a particular use case within various embodiments of the invention. Such a list of words can be referred to herein as a prompt list. In block 106, the special information uttered by the person in response to the prompt list, for a given use case, is identified within the recognized speech.

Alternatively, a portion of a voice recording (of predetermined duration) following a prompt, can be identified as an estimate of the location of an occurrence of special information. Utterances of different types of special information can be assumed to last for particular periods of time. In this way, a priori knowledge of the duration of an utterance can be used to identify the portion of the voice recording that corresponds to an utterance of special information.

Processing the voice recording splits at block 108, where a segment(s) of the voice recording that corresponds to a person's special information, uttered in reply to the prompt list, is rendered unintelligible at a block 112, following a path 110. Other segments of the voice recording that do not correspond to the human's special information bypass block 112 along a path 114. A segment(s) of special information can be rendered unintelligible within an analog or a digital form of a voice recording or within a textual (alpha-numeric) representation of a voice recording. The modified voice recording is available at 116 to be used by people or entities who are not supposed to have access to the human's special information.

Rendering segments of the voice recording unintelligible at block 112 (whether in analog or digital form or in a textual representation of the voice recording) can occur in a variety of ways, some of which are reversible and others of which are not reversible. Rendering unintelligible will be described below in more detail in conjunction with the figures that follow.

Alternatively, or in addition to the processing described above in conjunction with blocks 108 and 112, the voice recording can be associated with an identifier (metadata) at a block 109. The identifier can indicate that special information either is or is not contained within the voice recording. The identifier can contain various elements of metadata, such as data that indicates how the special information has been processed. For example, the identifier can indicate that the special information has been encrypted, deleted, masked, etc. The identifier can provide information relative to the use case under which the voice recording was obtained, the data owner, the data custodian, etc. Identifiers can also indicate that a voice recording is "clean," i.e., free of special information relative to a particular use case.

As mentioned above, a business entity can take on a variety of forms. Embodiments of the present invention are not limited by the form of the business entity and the examples of business entities provided herein do not limit embodiments of the invention. The examples of business entities given are provided for illustration purposes only and it is expected that embodiments of the invention will be applicable to business entities that are as of yet unknown.

For example, one form of business entity is the retail or wholesale establishment providing goods and/or services to customers. Examples include entertainments services (gambling, sports, etc.); financial services (banking, investment, etc.); transportation providers such as train, plane, boat, etc.; insurance; hard goods; soft goods; services such as cleaning, maintenance, etc. Another area is professional services, such as organizations that dispense medical or legal services to patients, clients, callers, etc. Yet another area is providers of public services, such as emergency services summoned through 911 calls, municipal services, social services, such as but not limited to various departments of health and human services (DHHS), departments of health and family services (DHFS), local, state, and federal government offices, agencies, etc.

Each of the business entities described above represents a use case (some represent the same use case, others represent a different use case), in which a suite of special information is established. The logical setting of the use case together with applicable laws will influence the information that a user(s) of the system will specify as being special and to which access will be restricted by the system within appropriate embodiments of the invention. Embodiments of the invention are applicable to use cases which are both presently known and unknown. As used herein, "use case" refers broadly to a scenario wherein special information pertaining to a user is obtained.

Figure 1B:
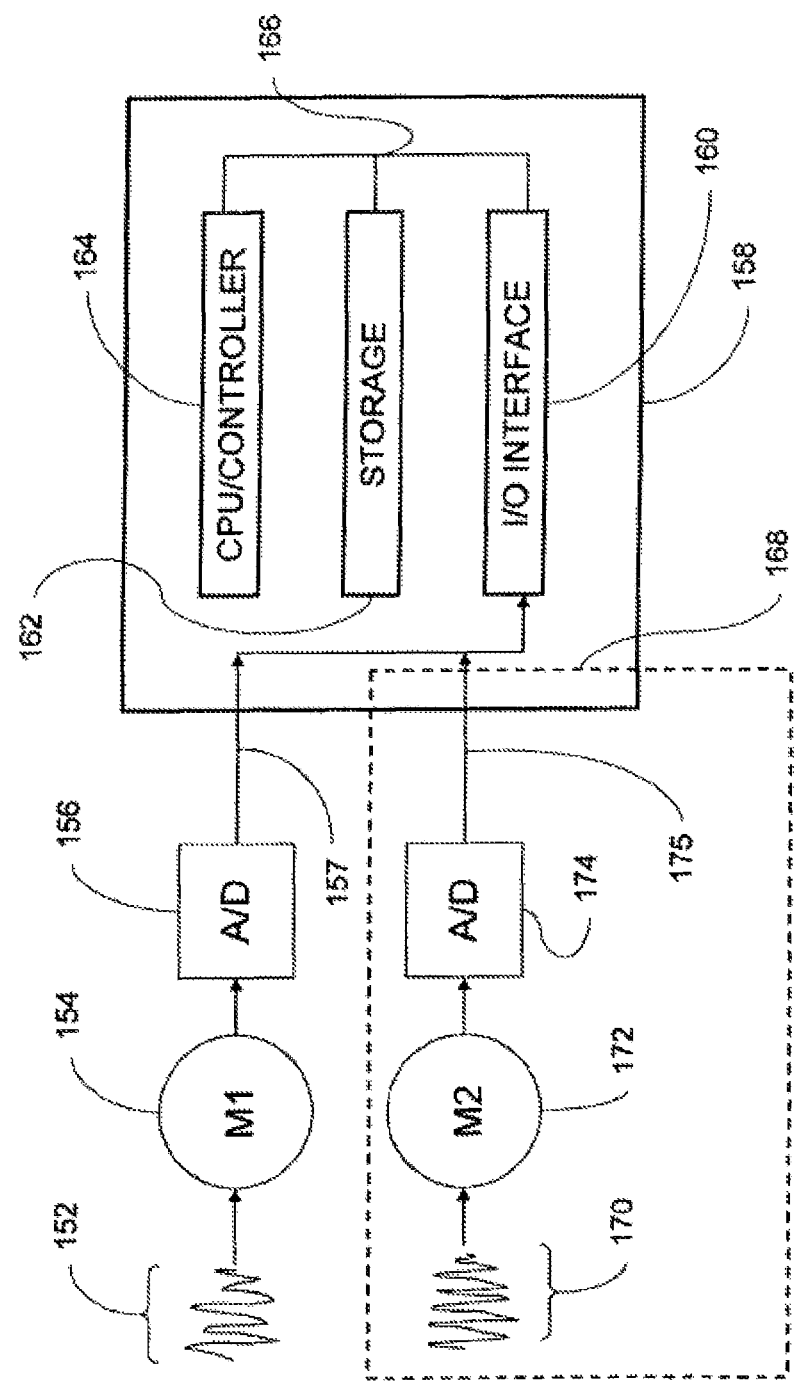
FIG. 1B depicts a recording system according to embodiments of the invention.

FIG. 1B depicts, generally at 150, a recording system according to embodiments of the invention that is capable of creating a voice recording, such as the voice recording 102 (FIG. 1A). With reference to FIG. 1B, a first person emits an utterance as indicated by an acoustic wave 152 (sound wave). The acoustic wave 152 is received by a transducer 154 where the acoustic wave causes an electrical signal to be emitted by the transducer 154. In one or more embodiments, the transducer 154 is a microphone. The transducer 154 emits an analog signal which is received by an analog-to-digital (AD) converter 156, where the analog signal is converted into a digital signal.

The speech signal is received by an interface 160. The interface 160 is in electrical communication with a storage device 162 and a controller 164 via an electrical path 166. In one or more embodiments, the controller 164 can be a central processing unit (CPU) and the electrical path 166 can be a bus that permits data to flow between the components associated therewith. The storage device 162 can represent one or more storage devices, such as memory and/or mass storage. The controller 158, the storage device(s) 162, the interface 160, and the electrical path 166 can be parts of a data processing system 158. In one or more embodiments, the data processing system 158 can be, as is known in the art, a computer, such as a portable computer, desktop computer, server, personal computer, a special purpose digital recorder, etc. It will be noted by those of skill in the art that various other structures can be included within the system of 150, such as but not limited to, gain blocks, filters, etc.

An optional input to the system shown in 150 is indicated at 168. A second person can utter an acoustic wave 170 (sound wave), which is captured by a transducer 172. The transducer 172 emits an analog electric signal in response to the acoustic wave incident thereon. The analog electrical signal is input to an analog-to-digital converter 174. The analog-to-digital converter 174 outputs a digital signal which is input to the interface 160.

Depending on the particular design of the recording system 150, the two digital voice inputs 157 and 175 can be combined into a single voice recording or they can be kept separate from each other within the recording system 150. Many alternatives exist; for example, in some systems analog signals from both speakers are captured and exist as a single analog signal that is input into a common analog-to-digital converter. A single digital signal results from such architecture that contains contributions from each of the speakers.

In yet other configurations, the system of 150 can be configured to generate an automated speech signal that propounds questions to a person who is part of a transaction with a business entity. In such a situation, the textual representation of the automated speech signal preexists, and as such does not need to be obtained by employing speech recognition processing.

It will be noted by those of skill in the art that an analog-to-digital converter (A/D) can be located at a variety of places within the signal path shown in FIG. 1B. For example, an A/D converter can be located proximate to the transducer, such as the transducer 154 and/or 172. Alternatively, one or more A/D converter(s) can be located within the data processing system 158.

Figure 2:
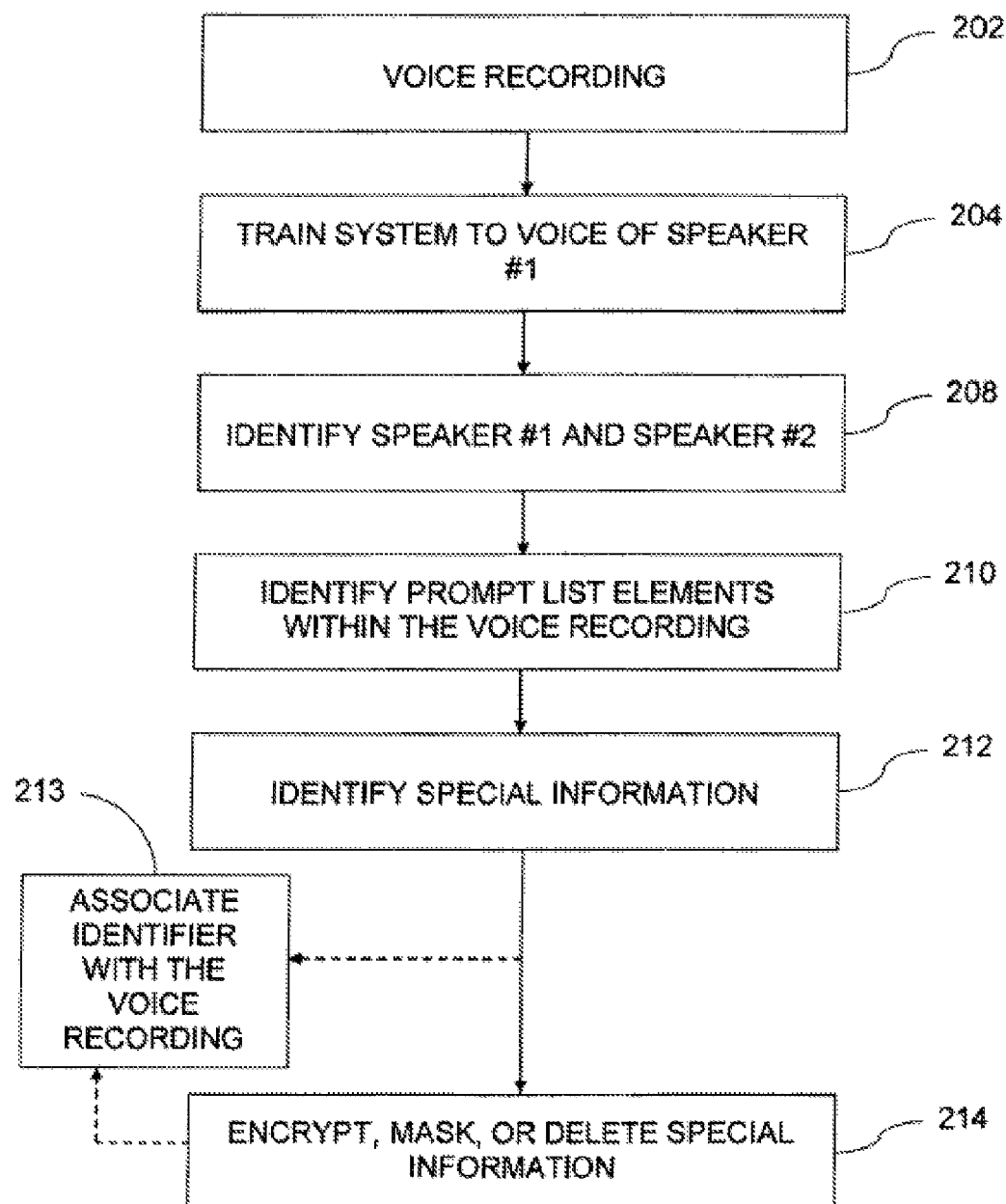
FIG. 2 illustrates processing a voice recording according to embodiments of the invention.

FIG. 2 illustrates, generally at 200, processing a voice recording according to embodiments of the invention. With reference to FIG. 2, a voice recording is input into a data processing system at 202. In one or more embodiments, the data processing system can be configured as shown in FIG. 1B at 158; however, the data processing system need not contain the functionality needed to create the voice recording.

In situations where the voice streams of two speakers are combined to make a voice recording and one of the two speakers is a regular speaker while the other speaker is, for the most part, different for each voice recording (as in random callers), training can be employed at block 204 to permit recognition of the regular speaker, resulting in a higher degree of translation accuracy by the speech recognition algorithm. As described above, transactions occur between an interface of a business entity and people who interact with the business during the transactions. Such transactions specify a collection of special information from which a prompt list is constructed. In one embodiment, a prompt list can include an "account number," and a "personal identification number" or "PIN."

Following the training described in conjunction with block 204, the voice recording 202 can be processed to identify the portions of the voice recording that are associated with the regular speaker at block 208. In a similar manner, the portions of the voice recording that were uttered by the person interacting with the business entity are identified at block 208. In one or more embodiments, speaker identification is optionally employed to identify the parts of the voice recording that correspond with the business entity (regular speaker). This is done to increase the likelihood of correctly identifying the parts of the voice recording that correspond with elements of the prompt list, since it is generally the business entity that prompts the person to utter special information. Using these identified portions of the voice recording, the voice recording is separated into strands corresponding to the two speakers. The prompt list candidates (residing in the strand corresponding to the business entity) are then processed at block 210 to search for the candidates that correspond to elements of the prompt list which pertain to the particular use case of interest.

Various quantitative analyses can be applied during the processing to establish which of the prompt list candidates are actually members of the prompt list. For example, if "social security number" is an element of a prompt list for a particular use case, then the prompt list candidates can be compared against "social security number" and a numerical score can be assigned to the prompt list candidates. The numerical scores are compared against a threshold that is used to establish a correct match between a prompt list candidate and an element of the prompt list. A resulting score that exceeds a threshold indicates a correct match and a score that is below the threshold indicates a non-match. Alternatively, the entire voice recording can be translated into text (without a speaker identification process) and the resulting text can be compared against the prompt list as described above, where scores are assigned to the parts of speech and a threshold establishes a match between prompt list candidates and the elements of the prompt list.

In block 212 the special information that follows an item found on the prompt list is identified. Identification can proceed by comparing an expected value with a translated value. For example, a prompt for a "social security number" should result in an utterance that has nine digits or least digits in the portion of the voice recording following the prompt. The voice recording following the prompt for the "social security number" is processed. If the processing results in an identification of a numerical utterance then a high confidence is assigned to the prospective utterance of special information. Conversely, if the processing results in an identification of letters, then a low confidence is assigned. Scores for the prompt list element and the resulting prospective utterance of special information are combined and a result above a certain threshold results in an identification of an utterance of special information.

Alternatively, identification can correspond with a portion of a voice recording following an identified prompt. For example, following a prompt for a credit card number, the next ten (10) seconds of the voice recording can be assumed to be an utterance of special information in response to the prompt. In another example, following a prompt for a Social Security number, the next fifteen (15) seconds of the voice recording can be assumed to be the location of the utterance of special information. Thus, in various embodiments, the special information can be identified by translation using speech recognition algorithms or by estimating an appropriate amount of time necessary for an utterance of special information following a prompt for the item of special information.

At block 214, the identified elements of text or numerical values that correspond with the special information uttered by the person are rendered unintelligible. Rendering unintelligible can be accomplished by recording a masking signal over a segment(s) of the original voice recording in the location of the utterance(s) of special information so identified. In one example, a noise signal [white noise, pink noise, tone, zero amplitude signal (erase), etc.] is recorded over the segment of the voice recording rendering the special information unintelligible. In another example, the segment of the voice recording corresponding to the utterance of special information is encrypted to render the utterance of special information unintelligible. Encryption can be reversed (decrypted) with a key if desired. Encryption and decryption are described in more detail below in figures that follow.

It will be noted that either an analog or a digital representation of the voice recording can be processed to render unintelligible the special information contained therein. Additionally, as described above, a textual representation of a voice recording can be processed to render unintelligible the elements of text that correspond with the segments of special information contained therein.

As an alternative, or in addition to the processes described in conjunction with block 214, the voice recording can be associated with an identifier at block 213. The identifier can indicate that special information either is or is not contained within the voice recording. In various embodiments, the identifier can be configured to provide the functionality described above in conjunction with the block 109 in FIG. 1A.

Alternatively, or in conjunction with the methods described above, speaker identification can be performed by placing a "marker" in the voice recording as the voice recording is being captured. Insertion of the "marker" can be triggered by the speech associated with the business entity. The "marker" can be used by a system to identify the prompt list candidates as well as to focus the search for utterances of special information. Such a "marker" can be, for example, a tone that is added to the voice recording which is above the audible range but within the bandwidth of the system used to capture the voice recording. The "marker" can be placed over the entire portions of the voice recordings corresponding with the chosen speaker or at the beginning and/or end of the portions associated therewith.

Figure 3:
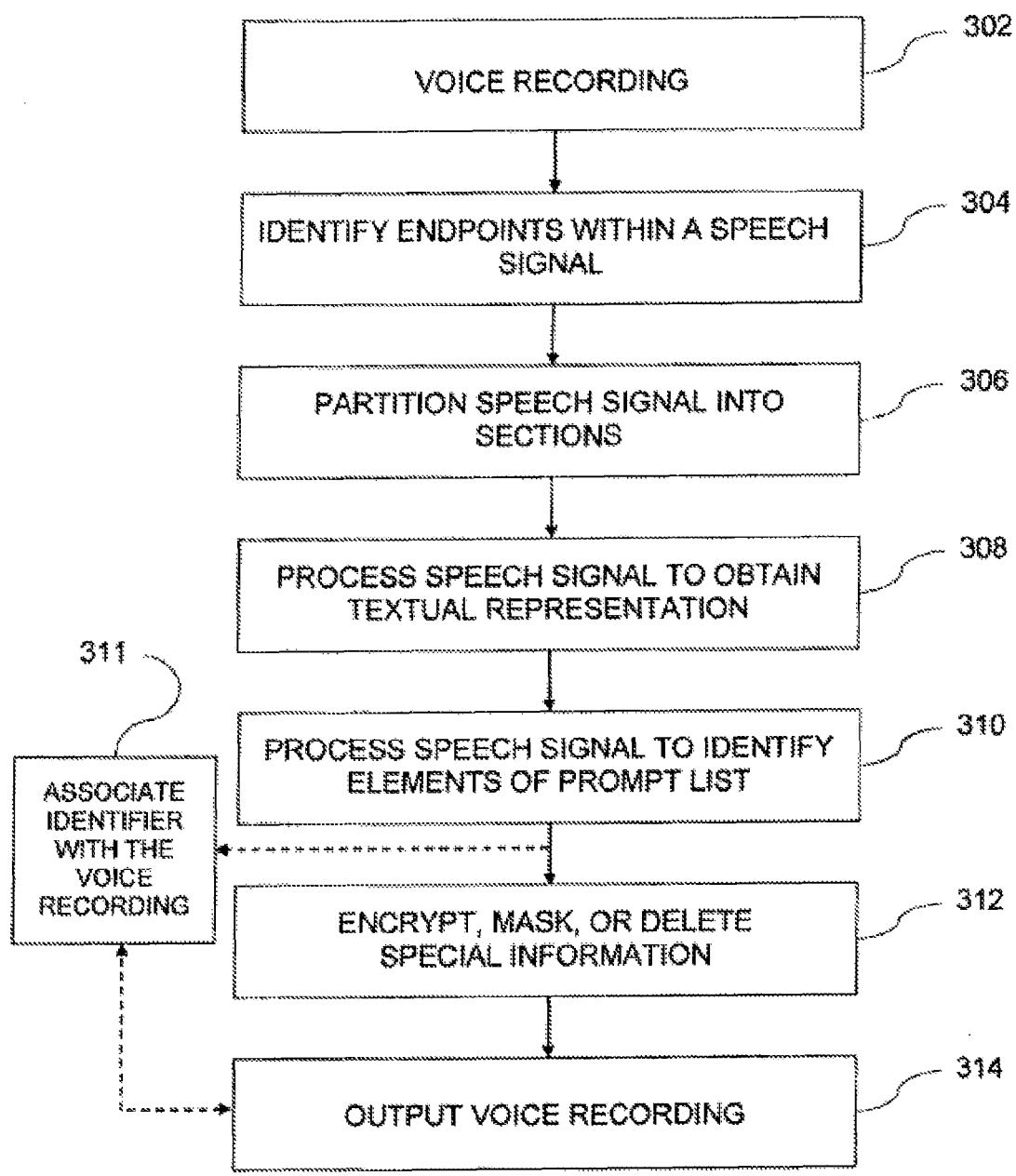
FIG. 3 using endpoints to process voice recordings according to embodiments of the invention.

FIG. 3 shows, generally at 300, using endpoints to process voice recordings according to embodiments of the invention. With reference to FIG. 3, a voice recording (speech signal) is input at block 302. At block 304, end points are identified within the voice recording. End points can be identified by various ways as is known to those of skill in the art such as by searching for a pause in the voice recording. A pause can be identified as a low level signal existing for a length of time, such as occurs between words or between sentences. Utilizing the endpoints, the speech signal is partitioned into sections at block 306. The speech signal is processed at block 308, wherein speech recognition is applied to translate the sections of the speech signal into elements of text.

The elements of text, obtained from block 308, are processed at block 310 to identify prompt list candidates. The prompt list candidates are compared against the prompt list for the use case of interest to identify which of the prompt list candidates are members of the prompt list. The identified members of the prompt list establish the portions of the voice recording wherein a prompt for an utterance of special information is made by the interface of the business entity. The portions of the voice recording following the prompts are analyzed according to logic applicable to a particular prompt as described above in conjunction with the preceding figures.

In block 312, the portions of the voice recording that correspond with the utterances of special information are rendered unintelligible following a determination that confidences of identification, associated with these portions of the voice recording, meets an established threshold(s). Evaluation criteria, such as scores associated with the portions of the voice recording corresponding to the prompts and the portions of the voice recording corresponding to the utterances of special information, are used to establish confidences of identification (scores). A confidence of identification (score) with respect to a given instance of special information is compared with a threshold value. If the score is above the threshold value then the portion of the voice recording corresponding to the utterance of special information is processed to render that portion of the voice recording unintelligible.

At block 314, the voice recording has been processed to render the special information unintelligible and is now in a proper condition to be transferred to an entity (person, business, etc.) that is not authorized to receive the special information that was formerly contained within the voice recording.

As an alternative, or in addition to the processes described in conjunction with blocks 312 and 314, the voice recording can be associated with an identifier at block 311. The identifier can indicate that special information either is or is not contained within the voice recording. In various embodiments, the identifier can be configured to provide the functionality described above in conjunction with the block 109 in FIG. 1A.

Figure 4A:
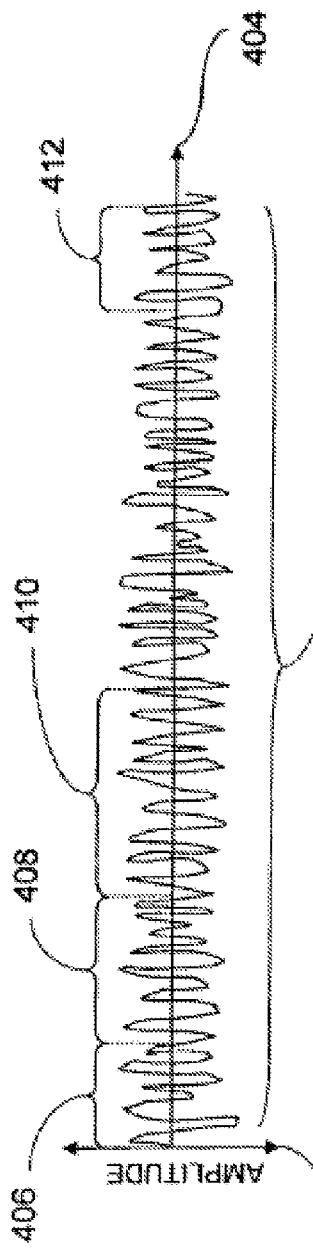
FIG. 4A illustrates an analog representation of a speech signal according to one embodiment of the invention.

FIG. 4A illustrates, generally at 400, an analog representation of a speech signal 414 according to one embodiment of the invention. With reference to FIG. 4A, the analog representation of the speech signal 414 is indicated by a plurality of parts, i.e., a first part 406, a second part 408, a third part 410, up to and including an n.sup.th part 412. An axis 402 indicates amplitude of the speech signal 414 and an axis 404 indicates time.

The speech signal 414 can contain both the prompts for special information and the utterances of special information or the speech signal 414 can contain either the prompts for special information or the utterances of special information. The information contained in the speech signal 414 depends on the way in which the speech signal has been obtained and/or processed. As described above in the preceding figures, the speech signal 414 is converted into a digital signal by an analog-to-digital converter and then the digital representation of the speech signal (voice recording) is input into a data processing system. The parts, 406, 408, 410, and 412 can represent prompts for special information, the utterances of special information or other parts of the voice recording that pertain to the use case of interest.

As described above in the preceding figures, the voice recording can be processed by the data processing system to obtain a voice recording that contains segments that have been rendered unintelligible. In other embodiments, the voice recording can be processed using the methods and apparatuses described above and then the results can be displayed and the final decision concerning whether to render a segment(s) unintelligible and/or to associate an identifier with the voice recording can be made by an operator(s). Such a decision(s) can be executed with the aid of a data processing system and a user interface configured for use in conjunction therewith.

Figure 4B:
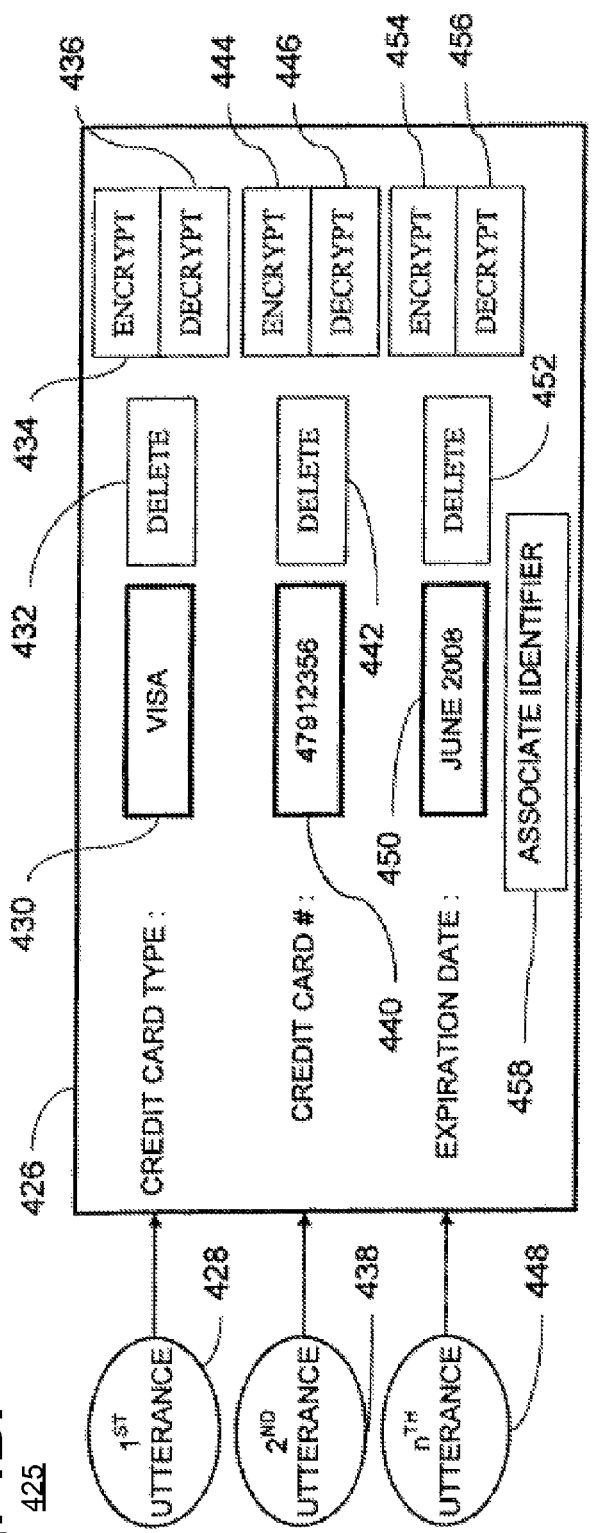
FIG. 4B depicts one embodiment of a user interface for processing voice recordings.

FIG. 4B depicts, generally at 425, one embodiment of a user interface for processing voice recordings. With reference to FIG. 4B, a user interface 426 that can be viewed and accessed on an information display of a data processing system is shown. As is recognized by those of skill in the art, the information display can be a cathode ray tube (CRT) flat panel display, touch screen, etc. Embodiments of the present invention are not limited by the information display used to present the user interface to the operator.

An utterance of special information 428, contained within a voice recording, is processed and the translation is displayed in a field 430 of the user interface 426. The textual representation shown in the field 430 is "VISA." Processing controls 432, 434, and 436 permit an operator(s) to process the portion of the voice recording that corresponds to the location containing the textual representation "VISA." The control 432 performs a "delete" function, the control 436 performs an "encrypt" function, and the control 434 performs a "decrypt" function if the text "VISA" has been encrypted previously.

Similarly, another utterance of special information 438, contained within the voice recording, is processed and the translation is displayed in a field 440 of the user interface 426. The textual representation shown in the field 440 is "47912356." Processing controls 442, 444, and 446 permit an operator to process the portion of the voice recording that corresponds to the location containing the textual representation "47912356." The control 442 performs a "delete" function, the control 446 performs an "encrypt" function, and the control 444 performs a "decrypt" function if the numbers "47912356" have been encrypted previously.

Yet another utterance of special information 448, contained within the voice recording, is processed and the translation is displayed in a field 450 of the user interface 426. The textual representation shown in the field 450 is "June 2008." Processing controls 452, 454, and 446 permit an operator to process the portion of the voice recording that corresponds to the location containing the textual representation "June 2008." The control 452 performs a "delete" function, the control 454 performs an "encrypt" function, and the control 456 performs a "decrypt" function if the textual representation "June 2008" has been encrypted previously.

Utilizing a user interface to display utterances of special information for a use case, an operator(s) can make a decision based on logical conditions that are associated with the use case and process the special information accordingly. For example, the special information shown in fields 430, 440, and 450 is logically related to the special information of a credit card. Therefore an operator would conclude, by observing this group, that the special information has been properly extracted by the system and the operator can process the special information as discussed previously.

Alternatively, or in addition to the processing described above in conjunction with FIG. 4B, an operator can associate an identifier with the voice recording utilizing a control 458. Such an identifier can function to provide notice that a particular voice recording contains special information, does not contain special information, or contains processed special information. In various embodiments, the identifier can be configured to provide the functionality described above in conjunction with the block 109 in FIG. 1A.

It will be noted that it is not always necessary to render unintelligible the exact words or the exact numbers uttered by a person when an utterance of special information occurs. For example, the numbers shown in the field 440 might not include all of the numbers that comprise the credit card account number. Currently, credit card account numbers have 16 digits; eight digits are displayed in the field 440, which represent a partial acquisition of the special information. However, in some use cases, a partial acquisition can provide a sufficient amount of information, which, when rendered unintelligible, constructively renders unintelligible the item of special information which, in this example, is the credit card (VISA) account number.

Another use case can present a different situation. For example, in a medical services application where an item of special information is a person's name, a greater degree of localization of the special information within the voice recording might be required. In such a case, a different threshold could be used for the evaluation of the scores described above in conjunction with the other figures. Other techniques can be employed, such as the way in which the voice recording is captured, separate voice channels for each speaker, speaker identification, variations in endpoint placement, etc.

Figure 5:
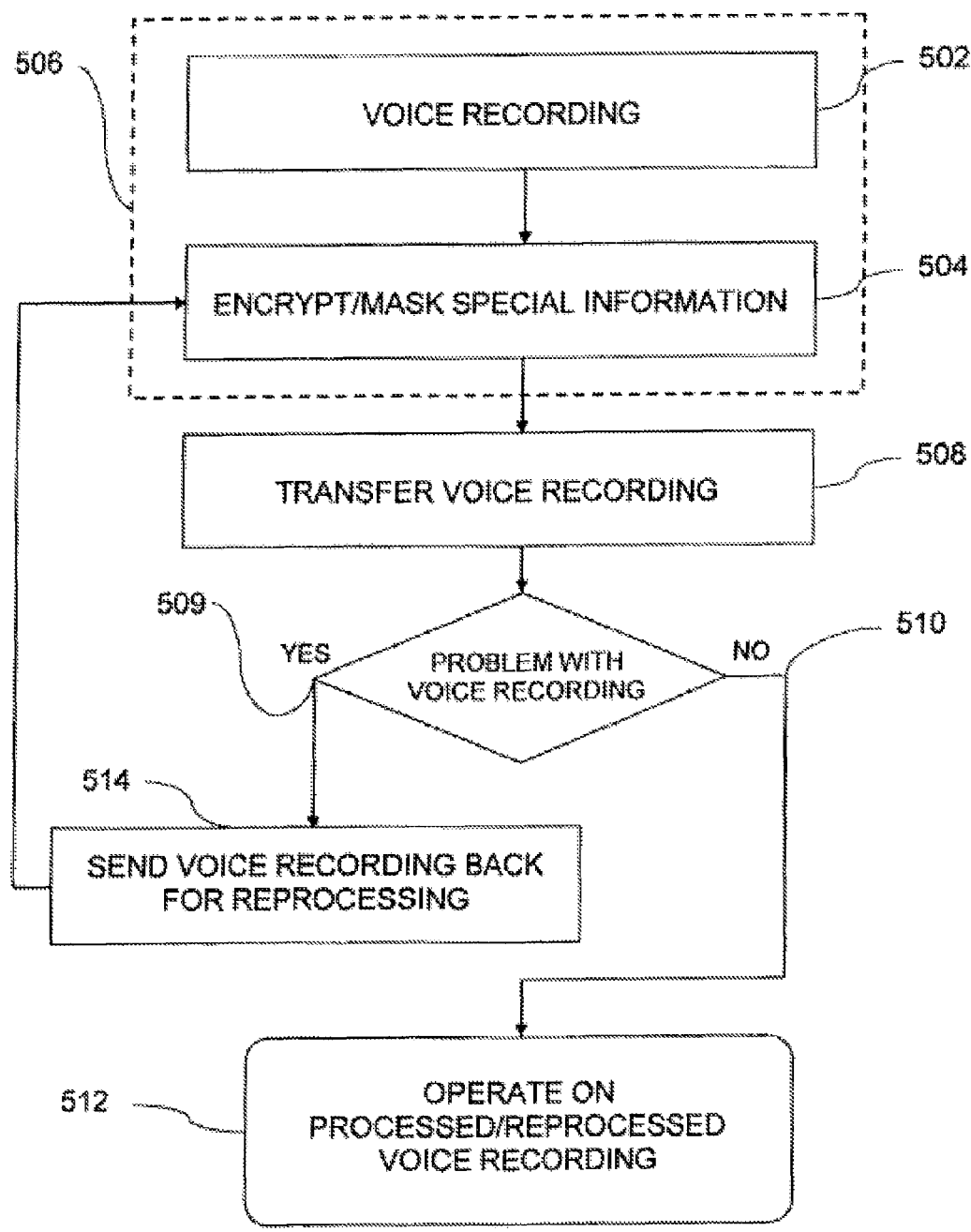
FIG. 5 illustrates reprocessing a voice recording according to embodiments of the invention.

FIG. 5 illustrates, generally at 500, reprocessing a voice recording according to embodiments of the invention. As described above, a voice recording is processed to render the locations within the voice recording that correspond to utterances of special information unintelligible. Reprocessing of these portions of the voice recording, to render them intelligible, can be performed when a reversible process is used to render the portions of the voice recording unintelligible. A reversible process is a process such as an encryption that is performed with a key so that a decryption can be performed to recover the original information that was previously encrypted. Processes for encryption/decryption utilizing keys are known to those of skill in the art and can be used within the various embodiments described herein.

With reference to FIG. 5, reprocessing voice recordings is described with respect to two entities, entity 1 and entity 2, generally at 500. Entity 1 and entity 2 have different relationships with respect to the information contained within the voice recording. As described above, a voice recording 502 is obtained from an interaction between a person and an interface of a business entity. The voice recording 502 contains special information that entity 1 has a right to access; however, for the purpose of this description, entity 2 has a different relationship to the special information. In one or more embodiments, the relationship of entity 2 to the special information is one of having less right to access than entity 1 has. In this example, the special information is rendered unintelligible, at block 504. Block 506 identifies a general realm where the special information is intelligible within the voice recording and the special information within the voice recording is under the control or agency of entity 1. When the voice recording flows outside of block 506 the special information is rendered unintelligible before reaching entity 2 at block 508.

Entity 2 receives a processed voice recording at block 508. Entity 2 can use the processed voice recording in a variety of ways. For example, some of the ways are, but are not limited to, analysis of the processed voice recordings, fulfillment of an order for goods or services, etc. Analyses of the processed voice recording can have various purposes, such as for the purpose of establishing a quality of service rendered, estimating competence of the interface of the business entity used to interact with the person who utters the special information, etc.

Entity 2 may determine that there is some need to reprocess the processed voice recording. For example, a problem with an unintelligible portion of a processed voice recording is found at 509. Such a problem could be that too much of the voice recording was rendered unintelligible during the initial processing or that too little of the voice recording was rendered unintelligible during the initial processing. In such instances, the processed voice recording is sent back to entity 1 at block 514 for reprocessing at block 504. If a reversible process was used to process the portion of the voice recording that has the problem, entity 1 reverses the process and takes appropriate action to correct the problem with the portion of the voice recording that was rendered unintelligible. Appropriate action can involve reprocessing the portion of the voice recording at issue with different processing parameters. Different processing parameters can be, for example, different threshold values for detecting prompts and utterances of special information, adjusted parameters used to produce confidence estimates for the identification of special information, application of speaker identification, or endpoint analysis to the voice recording, etc.

The reprocessed voice recording is transferred back to entity 2 at block 508. If there is no need for further reprocessing, the voice recording is passed to block 512, via path 510, where entity 2 can operate on the processed or reprocessed voice recording. The operations can vary according to the use case of interest as described above.

Entity 2 can function in a variety of roles with respect to the voice recording, such as but not limited to an agent or a contractor for entity 1. Entity 2 can have varying degrees of access to the special information contained within the voice recording depending on the relationship between entity 1 and entity 2.

In the arrangement described above, entity 1 maintains control of a key(s) used for the processing (encryption/decryption). Due to entity 2's different or limited relationship to the special information, entity 2 does not have access to the key(s) and cannot reprocess the voice recording. Such an arrangement provides security and limited access to the special information contained within the voice recording. It will be noted that entity 1 can authorize another entity, such as an entity 3 (not shown) to reprocess the voice recording. In such a case, the third party can be entrusted with a key(s) needed to process (encrypt/decrypt) the voice recordings.

Figure 6:
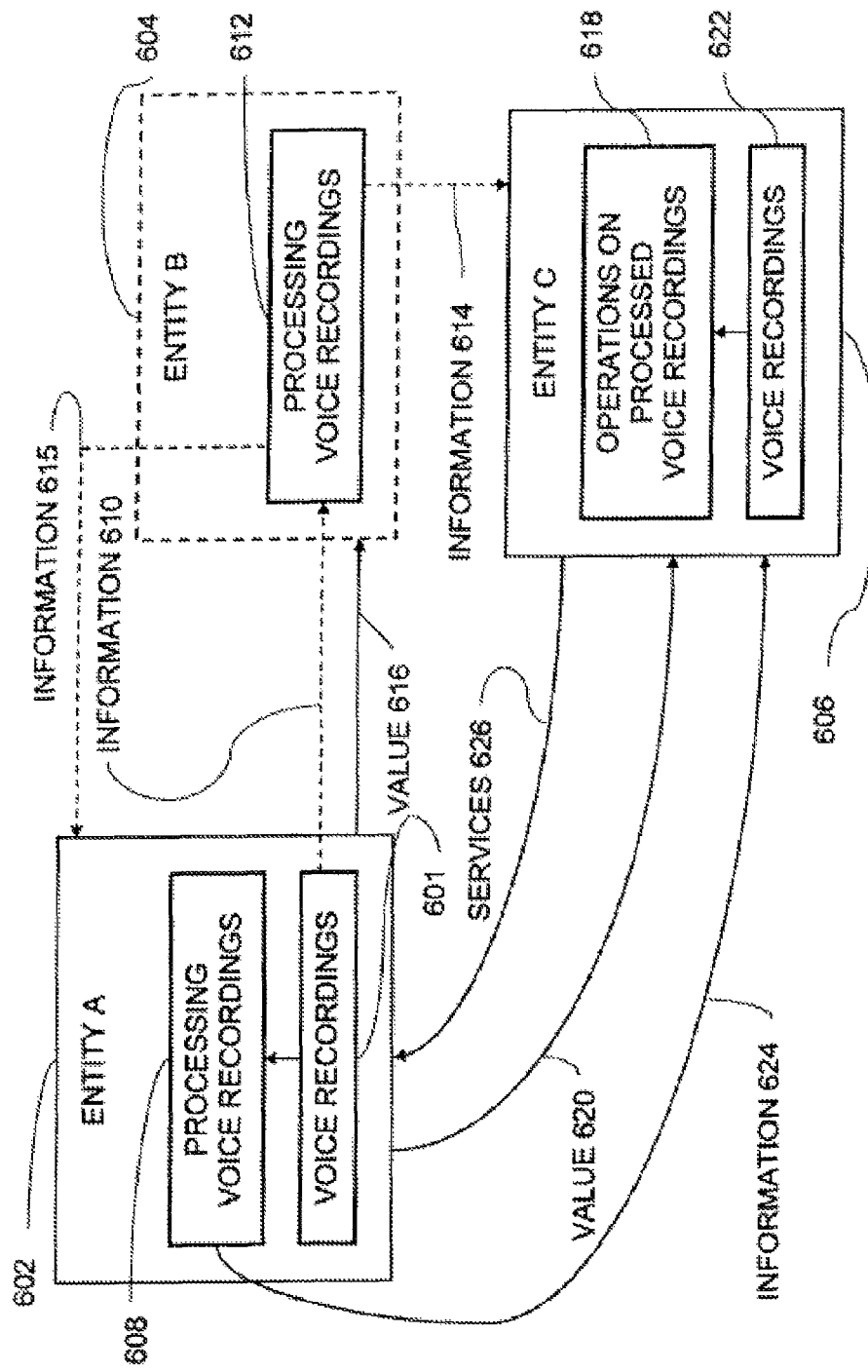
FIG. 6 illustrates information flow according to embodiments of the invention.

FIG. 6 illustrates, generally at 600, information and value flow according to embodiments of the invention. With reference to FIG. 6, an entity A, indicated at 602, has under its control voice recordings 601 that contain special information. As described above, special information can be confidential information, secret information, private information, etc., information that is generally considered not to be appropriate or lawful for all entities to access or possess. The special information is rendered unintelligible at block 608.

Alternatively, an entity B, indicated at 604, can process the voice recordings 612 to render unintelligible the special information contained therein. In some embodiments, the entity B will associate an identifier with a voice recording that contains special information (as described above in conjunction with the preceding figures). In some cases, the identifier will mark or flag a voice recording, thereby providing notice of special information, without rendering the special information, contained therein, unintelligible. Such marking can also provide notice that a voice recording is "clean" and does not contain special information. Information flows from the entity A 602 to the entity B 604 along a path 610. Value 616 can flow from the entity A 602 to the entity B 604 to provide compensation for the processing performed by the entity B 604 on the voice recordings. In one or more embodiments, value 616 takes the form of a debit or a credit that is transferred in exchange for services provided by the entity B 604. An example of a debit is an invoice or a bill to show what is owed and an example of a credit is payment in the form of valuable consideration.

The processed voice recordings can flow from the entity B 604 along various paths to one or more entities, such as the entity C 606 and/or the entity A 602. The processed voice recordings can flow as information 614 to an entity C at 606. The entity C 606 can perform operations on the processed voice recordings as previously described. The operations can vary according to the use case of interest as described above. Such operations can include, but are not limited to, performing analysis on the quality of service provided by an agent during a customer-agent interaction, etc. Output from the operations performed by the entity C 606, on the voice recordings, can flow as services 626 to the entity A 602. The entity C 606 can also function as a data custodian, thereby providing storage of the processed voice recordings. The processed voice recordings 612 can flow as information 615 to the entity A 602.

The processed voice recordings can flow as information 624 from the entity A 602 to the entity C 606. The entity C can perform operations on the processed voice recordings as previously described. Value 620 can flow from the entity A 602 to the entity C 606 and the output of the services 626 rendered by the entity C 606 can flow to the entity A 602 as services 626. In exchange for services rendered by the entity C 606, value 620 can flow from the entity A 602 to the entity C 606.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases mean that the feature(s) being described is included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A computer-implemented system for identifying special information comprising:
   a database storing a voice recording;
   a data processing system comprising memory, an input/output interface, and a central processing unit, wherein the central processing unit is configured to:
      define endpoints within the voice recording, identify one or more of the endpoints within the voice recording, and partition the voice recording into segments based on the identified endpoints;
      identify elements of text in each of the segments using automatic speech recognition;
      apply a list of prompt list elements to the text elements, wherein the prompt list elements each identify a prompt for special information;
      identify the segments with text elements that match one or more prompt list elements from the applied list;
      for each text element that matches one of the prompt list elements, determine a predetermined duration of the voice recording following that prompt list element, wherein the predetermined duration is dependent on a type of special information associated with that prompt list element; and
      identifying the special information within the predetermined duration of the voice recording; and
   a masking module to render unintelligible on a special purpose digital recorder the special information within the voice recording; and
   a delivery module to provide the voice recording to a third party with the identified special information rendered unintelligible.

2. A system according to claim 1, further comprising:
   a special information determination module to determine the special information by estimating an appropriate amount of time necessary for an utterance of the special information.

3. A system according to claim 1, further comprising:
   a special information determination module to determine the special information using speech recognition.

4. A system according to claim 1, wherein the endpoints are defined as pauses in the voice recording.

5. A system according to claim 1, further comprising:
   an assignment module to assign a confidence score to the identified special information.

6. A system according to claim 5, further comprising:
   a threshold module to apply a threshold value to the confidence score of the special information; and
   the masking module to render the special information unintelligible when the confidence score exceeds the threshold.

7. A system according to claim 1, further comprising:
   an identifier module to associate an identifier with the special information.

8. A system according to claim 7, wherein the identifier identifies that the special information is included in the voice recording or that the special information is not included in the voice recording.

9. A system according to claim 1, further comprising:
   a request module to receive a request for the special information and to access the unintelligible special information;
   a reverse rendering module to reverse the rendering of the special information as unintelligible; and
   a display to display the special information.

10. A computer-implemented method for identifying special information comprising:
    maintaining a voice recording in a database;
    defining endpoints within the voice recording via a data processing system comprising a central processing unit;
    identifying via the central processing unit one or more of the endpoints within the voice recording and partitioning the voice recording into segments based on the identified endpoints;
    identifying elements of text using automatic speech recognition;
    applying via the central processing unit a list of prompt list elements to the text elements, wherein the prompt list elements each identify a prompt for special information;
    identifying the segments with text elements that match one or more prompt list elements from the applied list;
    for each text element that matches one of the prompt list elements, determining a predetermined duration of the voice recording following that prompt list element based on a type of special information associated with that prompt list element;
    rendering unintelligible on a special purpose digital recorder the special information within the voice recording via the central processing unit; and
    providing the voice recording to a third party with the identified special information rendered unintelligible.

11. A method according to claim 10, further comprising:
    determining the special information by estimating an appropriate amount of time necessary for an utterance of the special information.

12. A method according to claim 10, further comprising:
    determining the special information using speech recognition.

13. A method according to claim 10, wherein the endpoints are defined as pauses in the voice recording.

14. A method according to claim 10, further comprising:
    assigning a confidence score to the identified special information.

15. A method according to claim 14, further comprising:

applying a threshold value to the confidence score of the special information; and rendering the special information unintelligible when the confidence score exceeds the threshold.

16. A method according to claim 10, further comprising:

associating an identifier with the special information.

17. A method according to claim 16, wherein the identifier identifies that the special information is included in the voice recording or that the special information is not included in the voice recording.

18. A method according to claim 10, further comprising:

determining a predetermined duration of the voice recording following that prompt list element based on a type of special information associated with that prompt list candidate for each text element that matches one of the prompt list elements;

receiving a request for the special information and accessing the unintelligible special information;

reversing the rendering of the special information as unintelligible; and displaying the special information.

\* \* \* \* \*